(12) United States Patent
Vitt et al.

(10) Patent No.: US 11,208,912 B2
(45) Date of Patent: Dec. 28, 2021

(54) TURBINE ENGINE WITH FLOATING SHROUDS

(71) Applicant: General Electric Company, Schenectady, NY (US)

(72) Inventors: Paul Hadley Vitt, Liberty Township, OH (US); Andrew Breeze-Stringfellow, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 110 days.

(21) Appl. No.: 16/219,059

(22) Filed: Dec. 13, 2018

(65) Prior Publication Data
US 2020/0191009 A1 Jun. 18, 2020

(51) Int. Cl.
| | | |
|---|---|---|
| *F01D 11/16* | (2006.01) | |
| *F01D 5/22* | (2006.01) | |
| *F01D 25/24* | (2006.01) | |

(52) U.S. Cl.
CPC .............. *F01D 11/16* (2013.01); *F01D 5/225* (2013.01); *F01D 25/24* (2013.01); *F05D 2240/11* (2013.01)

(58) Field of Classification Search
CPC .......... F01D 25/24; F01D 5/225; F01D 11/16; F01D 11/08; F01D 11/18; F05D 2240/11
See application file for complete search history.

(56) References Cited

U.S. PATENT DOCUMENTS

| | | | |
|---|---|---|---|
| 5,630,700 A | 5/1997 | Olsen et al. | |
| 5,642,615 A | 7/1997 | Porte et al. | |
| 6,877,952 B2 * | 4/2005 | Wilson | F01D 11/18 415/136 |
| 7,207,771 B2 * | 4/2007 | Synnott | F01D 11/08 415/173.1 |
| 7,229,246 B2 * | 6/2007 | Ghasripoor | F01D 11/16 415/173.3 |
| 7,238,002 B2 * | 7/2007 | Cairo | F01D 11/005 415/119 |
| 7,556,475 B2 * | 7/2009 | Roberts, III | F01D 11/08 29/889.2 |
| 7,874,793 B2 | 1/2011 | Razzell et al. | |
| 8,082,726 B2 | 12/2011 | Cloft | |

(Continued)

OTHER PUBLICATIONS

J.S.ALFORD, Protecting Turbomachinery From Self-Excited Rotor Whirl, Journal of Engineering for Power, Oct. 1965, General Electric Company, Cincinnati, Ohio, US.

*Primary Examiner* — Courtney D Heinle
*Assistant Examiner* — Andrew Thanh Bui
(74) *Attorney, Agent, or Firm* — McGarry Bair PC

(57) ABSTRACT

A shroud assembly for a gas turbine engine includes: at least one shroud hanger; an annular array of shroud segments carried by the child hanger at least one and arrayed about an engine centerline axis, each of the shroud segments having a flowpath side defining a portion of a primary engine flowpath, and an opposed backside facing the at least one shroud hanger, wherein the shroud segment is mounted to the at least one shroud hanger such that it is movable in a radial direction between an inboard position and an outboard position, in response to a balance of gas pressures prevailing on the flowpath side and the backside; and biasing means which urge each of the shroud segments towards one of the positions.

17 Claims, 5 Drawing Sheets

(56) References Cited

U.S. PATENT DOCUMENTS

| | | |
|---|---|---|
| 8,186,945 B2 | 5/2012 | Bhatnagar et al. |
| 9,903,218 B2 * | 2/2018 | Hafner .................... F01D 25/08 |
| 9,945,243 B2 | 4/2018 | O'Leary |
| 10,655,491 B2 * | 5/2020 | Shoemaker ........... F01D 25/246 |
| 10,677,084 B2 * | 6/2020 | Smoke .................. F01D 11/122 |
| 2006/0067815 A1 * | 3/2006 | Ghasripoor ............. F01D 11/16 415/170.1 |
| 2016/0102572 A1 | 4/2016 | O'Leary |
| 2017/0044922 A1 * | 2/2017 | Shapiro .................. F01D 11/22 |
| 2017/0175646 A1 | 6/2017 | Adibhatla |

\* cited by examiner

TURBINE ENGINE WITH FLOATING SHROUDS

BACKGROUND OF THE INVENTION

This invention relates generally to gas turbine engines and more particularly to turbine shrouds of such engines.

A gas turbine engine includes a turbomachinery core having a high-pressure compressor, combustor, and high-pressure turbine in serial flow relationship. The core is operable in a known manner to generate a primary gas flow. A turbofan engine adds to the basic core a low-pressure turbine which drives a fan and/or booster to produce propulsive thrust.

Each of the turbines includes one or more rotors which extract energy from the primary gas flow. Each rotor comprises an annular array of blades or buckets carried by a rotating disk. The flowpath through the rotor is defined in part by annular, segmented shrouds.

A radial tip clearance is present between the tips of the blades and the shroud segments. It is generally desirable that the tip clearance be as small as possible to maximize efficiency of the turbine, while also avoiding interference ("rubs") between the turbine blades and the shroud segments. The tip clearance has an as-assembled static value defined by the dimensions and relative positions of the various components. During engine operation, numerous factors inherent to the engine configuration can cause the tip clearance to change from the static value, generally in a uniform manner about the circumference of the shroud. Examples of such factors include: thermal growth of the shroud assembly, thermal growth of the rotor, and centrifugal loads on the turbine blades. Additionally, it is known to manipulate the tip clearance using an active clearance control system ("ACC").

In addition to the generally uniform tip clearance variation described above, the tip clearance can vary non-uniformly. For example, eccentricity of the rotor is known to cause local variation of tip clearance around the circumference of the shroud assembly as the rotor orbits.

Circumferential variations in pressure are generated by the local variations in tip clearance. The pressure variations due to eccentricity of the rotor ultimately cause an unbalanced torque to develop on the rotor, resulting in a net unbalanced force on the rotor. This unbalanced force can cause the rotor to whirl in the direction of rotation. These forces are described in Alford, J. S. "Protecting Turbomachinery from Self-Excited Rotor Whirl." *ASME Journal of Power Engineering* Vol. 87 No. 4 (1965): pp. 333-343. This phenomenon is commonly referred to as "Alford whirl".

Prior art solutions to Alford whirl include stiffening the rotor system including shafts, disks, and/or bearings. One aspect of this approach is that it undesirably increases engine weight.

BRIEF DESCRIPTION OF THE INVENTION

This problem is addressed by a turbomachinery rotor stage incorporating a shroud made up of a ring of segments which can float individually in the radial direction According to one aspect of the technology described herein, a shroud assembly for a gas turbine engine includes: at least one child hanger; an annular array of shroud segments carried by the at least one shroud hanger and arrayed about a centerline axis of the engine, each of the shroud segments having a flowpath side defining a portion of a primary engine flowpath, and an opposed backside facing the at least one shroud hanger, wherein the shroud segment is mounted to the at least one shroud hanger such that it is movable in a radial direction between an inboard position and an outboard position, in response to a balance of gas pressures prevailing on the flowpath side and the backside; and biasing means which urge each of the shroud segments towards one of the positions.

According to another aspect of the technology described herein, a gas turbine engine includes: a compressor; a combustor disposed downstream of the compressor and a turbine disposed downstream of the combustor, the turbine including a rotor having a rotatable disk carrying a plurality of turbine blades, the turbine mechanically connected to the compressor by a shaft rotatable about an engine centerline axis, the turbine further including a shroud assembly surrounding the rotor, wherein the shroud assembly includes: at least one shroud hanger arrayed around the centerline axis; an annular array of shroud segments carried by the at least one shroud hanger, each of the shroud segments having a flowpath side defining a portion of a primary engine flowpath, and an opposed backside facing the at least one shroud hanger, wherein the shroud segment is at least one to the respective shroud hanger such that it is movable in a radial direction between an inboard position and an outboard position, in response to a balance of gas pressures prevailing on the flowpath side and the backside; and biasing means which urge each of the shroud segments towards one of the positions.

According to another aspect of the technology described herein, a method is provided for reducing whirl in a gas turbine engine of the type including: a compressor; a combustor disposed downstream of the compressor and a turbine disposed downstream of the combustor, the turbine including a rotor having a rotatable disk carrying a plurality of turbine blades, the turbine mechanically connected to the compressor by a shaft rotatable about an engine centerline axis, the turbine further including a shroud assembly surrounding the rotor, wherein the shroud assembly includes: an annular array of shroud segments each having a flowpath side defining a portion of her primary engine flowpath, and an opposed backside. The method includes: mounting each of the shroud segments to a shroud hanger such that it is individually movable in a radial direction between an inboard position and an outboard position, in response to a balance of gas pressures prevailing on the flowpath side and the backside during engine operation.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
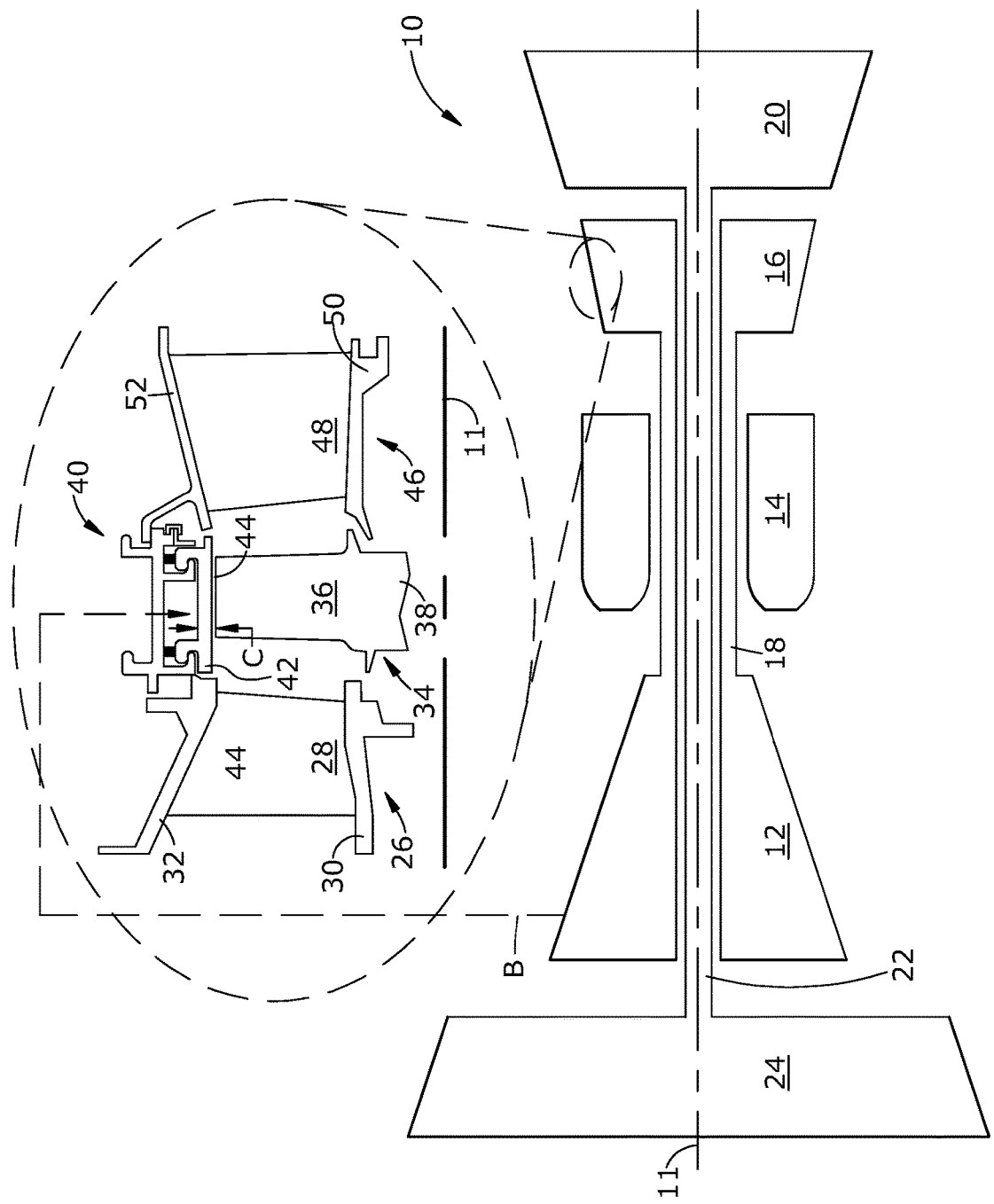
FIG. 1 is a schematic cross-sectional view of a high-pressure turbine of a turbine engine.

Referring to the drawings wherein identical reference numerals denote the same elements throughout the various views, FIG. 1 depicts schematically an exemplary gas turbine engine 10 having a centerline axis 11 and including in sequential flow sequence, a compressor 12, a combustor 14, and a high-pressure turbine ("HPT") 16. In operation, the compressor 12 provides compressed air that passes primarily into the combustor 14 to support combustion and partially around the combustor 14 where it is used to cool both the combustor liners and turbomachinery further downstream. Fuel is introduced into the forward end of the combustor 14 and is mixed with the air in a conventional fashion. The resulting fuel-air mixture flows into the combustor 14 where it is ignited to generate hot combustion gases. The hot combustion gases are discharged to the HPT 16 where they are expanded so that energy is extracted. The HPT 16 drives the compressor 12 through an outer shaft 18. In the illustrated example, the engine 10 is a turbofan engine and a low-pressure turbine ("LPT") 20 is located downstream of the HPT 16 and coupled to an inner shaft 22 which in turn drives a fan 24 for providing propulsive thrust to a vehicle. However, the principles described herein are equally applicable to other configurations of gas turbine engines.

The detail view of FIG. 1 shows a portion of the HPT 16. This particular HPT is multiple-stage, but the principles described herein are applicable to single-stage turbines as well. The concept can be applied to all stages in a multiple stage configuration.

The HPT 16 includes a first stage nozzle 26 which comprises a plurality of circumferentially spaced airfoil-shaped first stage vanes 28 that are supported between an arcuate, segmented first stage inner band 30 and an arcuate, segmented first stage outer band 32. The first stage vanes 28, first stage inner band 30 and first stage outer band 32 are arranged into a plurality of circumferentially adjoining nozzle segments that collectively form a complete assembly. The first stage inner and outer bands 30 and 32 define the outer and inner radial flowpath boundaries, respectively, for the hot gas stream flowing through the first stage nozzle 26. The first stage vanes 28 are configured so as to optimally direct the combustion gases to a rotor 34.

Figure 2:
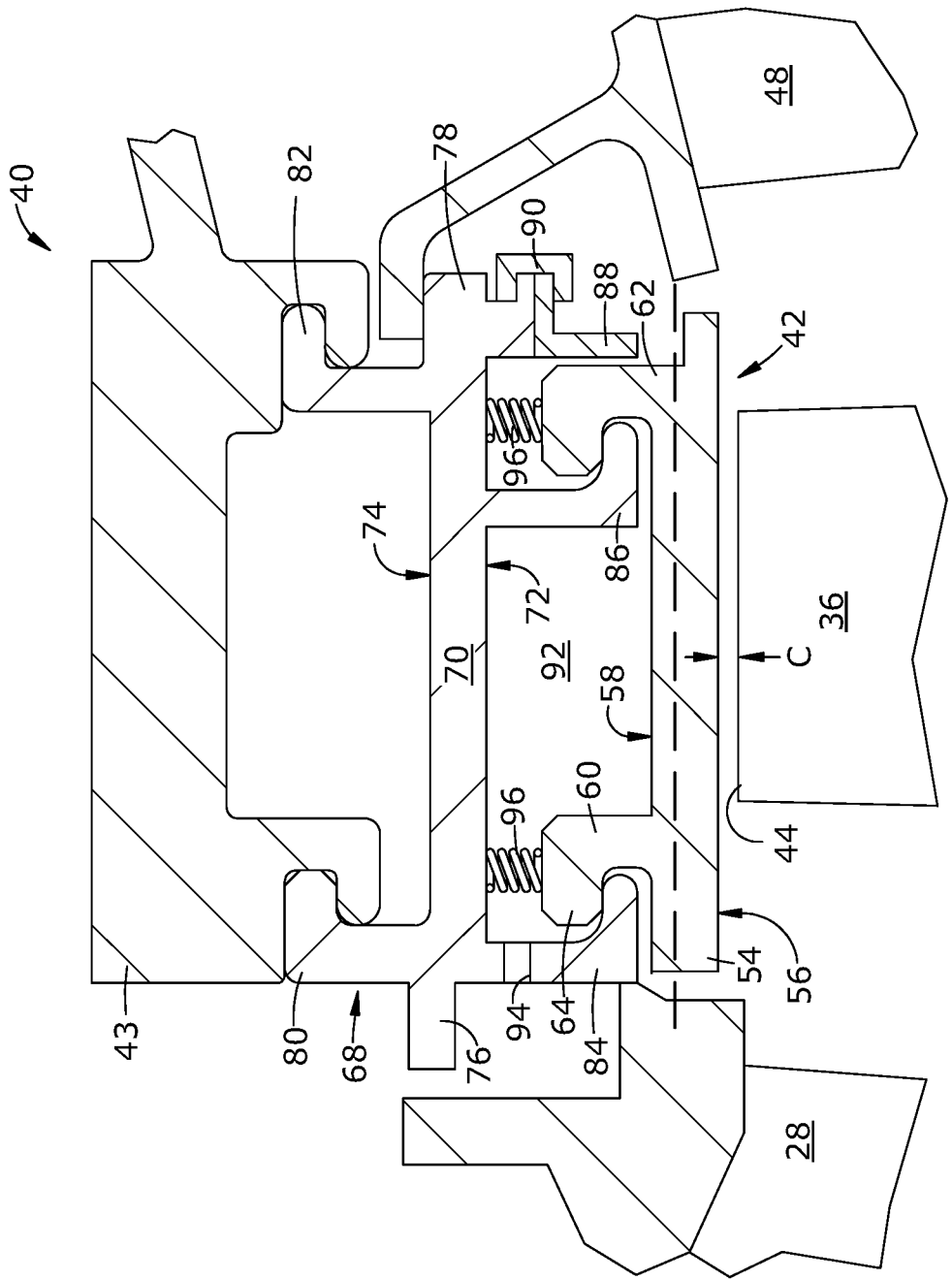
FIG. 2 is a cross-sectional view of a turbine shroud assembly shown in FIG. 1.

The rotor 34 includes an array of airfoil-shaped turbine blades 36 extending outwardly from a disk 38 that rotates about the centerline axis 11 of the engine 10. A shroud assembly 40 comprising a plurality of shroud segments 42 is arranged so as to closely surround the tips 44 of the turbine blades 36 and thereby define the outer radial flowpath boundary for the hot gas stream flowing through the rotor 34. The shroud segments 42 are surrounded and supported by an annular HPT case 43 (FIG. 2).

A second stage nozzle 46 is positioned downstream of the rotor 34, and comprises a plurality of circumferentially spaced airfoil-shaped second stage vanes 48 that are supported between an arcuate, segmented second stage inner band 50 and an arcuate, segmented second stage outer band 52. The second stage vanes 48, second stage inner band 50 and second stage outer band 52 are arranged into a plurality of circumferentially adjoining nozzle segments that collectively form a complete assembly. The second stage inner and outer bands 50 and 52 define the inner and outer radial flowpath boundaries, respectively, for the hot gas stream flowing through the second stage turbine nozzle 46.

A radial tip clearance "C" is present between the blade tips 44 and the shroud segments 42. It is generally desirable that the clearance C be as small as possible to maximize efficiency of the HPT 16, while also avoiding interference ("rubs") between the turbine blades 34 and the shroud segments 42. The tip clearance C has an as-assembled static value defined by the dimensions and relative positions of the various components. During engine operation, numerous factors inherent to the engine configuration can cause the tip clearance C to change from the static value, generally in a uniform manner about the circumference of the shroud assembly 40. Examples of such factors include: thermal growth of the shroud assembly 40, thermal growth of the rotor 34, and centrifugal loads on the turbine blades 36. Additionally, it is known to manipulate the tip clearance C using an active clearance control system ("ACC"), not shown.

In addition to the generally uniform tip clearance variation described above, the tip clearance C can vary non-uniformly. For example, eccentricity of the rotor 34 is known to cause local variation of tip clearance C around the circumference of the shroud assembly 40. Another possible cause of variable clearance is thermal distortion in the turbine case 43 (FIG. 2). The local tip clearance variations cause circumferential variations in flowpath gas pressure in the space between the blade tips 44 and the shroud segments 42. A smaller clearance results in higher pressure, and a larger clearance results in a lower pressure. Those pressure variations contribute to Alford whirl described above.

In order to reduce or prevent Alford whirl, the individual shroud segments 42 of the shroud assembly 40 may be configured such that they have freedom to move radially outboard whenever the flowpath pressure exceeds a predetermined threshold (i.e., as a result of the tip clearance C closing locally). This outboard movement causes the tip clearance C to open in areas of high pressure, relieving the Alford whirl force. Biasing means are provided to keep the shroud segments in a neutral position when pressures are normal. Several exemplary embodiments of floating shroud assemblies are described herein.

FIG. 2 illustrates one embodiment of a shroud assembly 40 in more detail. Each shroud segment 42 includes a base 54 having a flowpath surface 56 which faces the blade tip 44, and an opposed backside surface 58. The flowpath surface 56 defines a portion of the primary engine flowpath. The flowpath surface 56 has a surface area "A1". Forward and aft walls 60 and 62, respectively extend radially outwardly from the backside surface 58. The forward wall 60 includes a forward flange 64. The aft wall 62 includes an aft flange 66. It will be understood that the forward and aft walls 60 and 62 may be interconnected by radially outwardly extending, spaced-apart side walls (not shown), to define a shroud cavity. The backside surface 58 has a surface area "A2".

The shroud segments 42 are supported by an array of one or more arcuate shroud hangers 68. An individual shroud hanger 68 may support one or more individual shroud segments 42. The shroud hanger 68 is a unitary component and has an arcuate body 70 with opposed inner and outer faces 72 and 74, and opposed forward and aft ends 76 and 78. A forward mounting rail 80 having a generally L-shaped cross-section with axial and radial legs extends from the outer face 74, at or near the forward end 76. An aft mounting rail 82 having a generally L-shaped cross-section extends from the outer face 74, at or near the aft end 78. The forward and aft mounting rails 80, 82 are used to secure the shroud hanger 68 to the HPT case 43 or other structural support element.

A forward hook 84 having a generally L-shaped cross-section extends radially inward from the inner face 72, at or near the forward end 76. An aft hook 86 having a generally L-shaped cross-section extends radially inward from the inner face 72, at or near the aft end 78.

The forward hook 84 axially overlaps the forward flange 64 of the shroud segment 42. The aft hook 86 axially overlaps the aft flange 66 of the shroud segment 42. The dimensions of the shroud segment 42 and the shroud hanger 68 are selected so that the shroud segment 42 has some freedom of movement in the radial direction relative to the shroud hanger 68, to move between a first, radially inboard position as seen in FIG. 2, and a second, radially outboard position, shown by a dashed line.

In the illustrated example, a generally arcuate bracket 88 with an L-shaped cross-section is disposed adjacent the aft flange 66 and functions to hold the shroud segment 42 in the proper axial position, as well as permitting assembly and disassembly of the shroud segment 42. The bracket 88 is secured to the shroud hanger 68 by a generally arcuate retainer 90 of C-shaped cross section, commonly referred to as a C-clip. Both the bracket 88 and retainer 90 may take the form of a single ring with a gap for thermal expansion or may comprise multiple arcuate segments.

A shroud plenum 92 is defined between the shroud hanger 68 and the shroud segment 42. One or more supply holes are 94 are formed in the shroud hanger 68. In operation, cooling air from a source within the engine, for example compressor bleed air "B" (see FIG. 1) is routed to the supply holes 94. It subsequently flows into the shroud plenum 92 where is it used for cooling and/or pressurization.

Biasing means are provided to bias or urge the shroud segment 42 in a predetermined radial direction (either inboard or outboard). In the illustrated example, biasing means urge the shroud segments 42 radially inwards towards the first position described above, which is the radially inward limit of movement of the shroud segment 42. In the illustrated example, the biasing means comprise one or more springs 96 disposed between the forward wall 60 and the shroud hanger 68, and one or more springs 96 disposed between the aft wall 62 and the shroud hanger 68. Coil-type compression springs are shown as an example, but it will be understood that any type of spring with adequate dimensions, material properties, and spring constant "k" may be used. While virtually all materials exhibit some degree of elastic deflection, it will be understood that the effective spring constant of the biasing means would be substantially less than that of any elastic modulus or effective spring constant of the surrounding components such as the shroud hangers 68 and/or shroud segment 42. Stated another way, for purposes of the present invention, the shroud segments 42 and the shroud hangers 68 are essentially rigid and would not be expected to distort or deflect to any significant degree in response to the balance of gas pressures described below. In other words, the intentional movement of the assembly for the purpose of reducing Alford whirl would be primarily limited to radial movement of the shroud segment 42 as a whole, balanced by deflection of the biasing means, as described in detail below.

In operation, the shroud plenum 92 is supplied with pressurized air (for example compressor bleed air 98 (see FIG. 1) at a first static pressure "Pp". This pressure exerts an inboard-directed force "Fp" on the shroud segment 42, where $Fp=Pp*A2$.

The springs 96 or other biasing element exert an inboard-directed force "Fsp" defined as $Fsp=kx$, where k is the spring constant, and x is the deflection from the free length of the spring 96.

Simultaneously, the flowpath surface 56 is exposed to flowpath air at a second static pressure "Pfp". This pressure exerts an outboard-directed force "Ffp", where $Ffp=Pfp*A1$. The pressure Pfp (and thus force Ffp) varies circumferentially, with the circumferential location of peak pressure Pfp orbiting about the centerline axis 11 at the whirl frequency.

The balance between the "cold side" forces (Fp+Fsp) and the "hot side" forces (Ffp) determines the radial position of the shroud segment 42.

In one condition, Ffp is less than Fp+Fsp, and the shroud segment position is nominal.

In another condition, Ffp is greater than Fp+Fsp, and the shroud segment 42 is forced outboards, opening the clearance "C". This has the effect of relieving (lowering) the flowpath gas pressure at the tip 44 of the turbine blade 36 and thus reducing the forces that contribute to Alford whirl. As the circumferential location of peak pressure passes the shroud segment 42, the hot side forces drop below the cold side forces and the shroud segment 42 returns to the nominal inboard position. This process continues as the rotor 34 rotates, with each adjacent shroud segment 42 of the shroud assembly 40 able to respond individually to increases in flowpath pressure.

Generally, Alford whirl presents the greatest problems at high engine power (unbalanced torque is directly proportional to the physical pressure in the turbine, which is highest at high engine power conditions). Preferably, the biasing means are selected such that at lower power settings (e.g. aircraft cruise flight) the cold side forces will hold the shroud segment 42 in the nominal position, generally the fully inboard limit.

Figure 3:
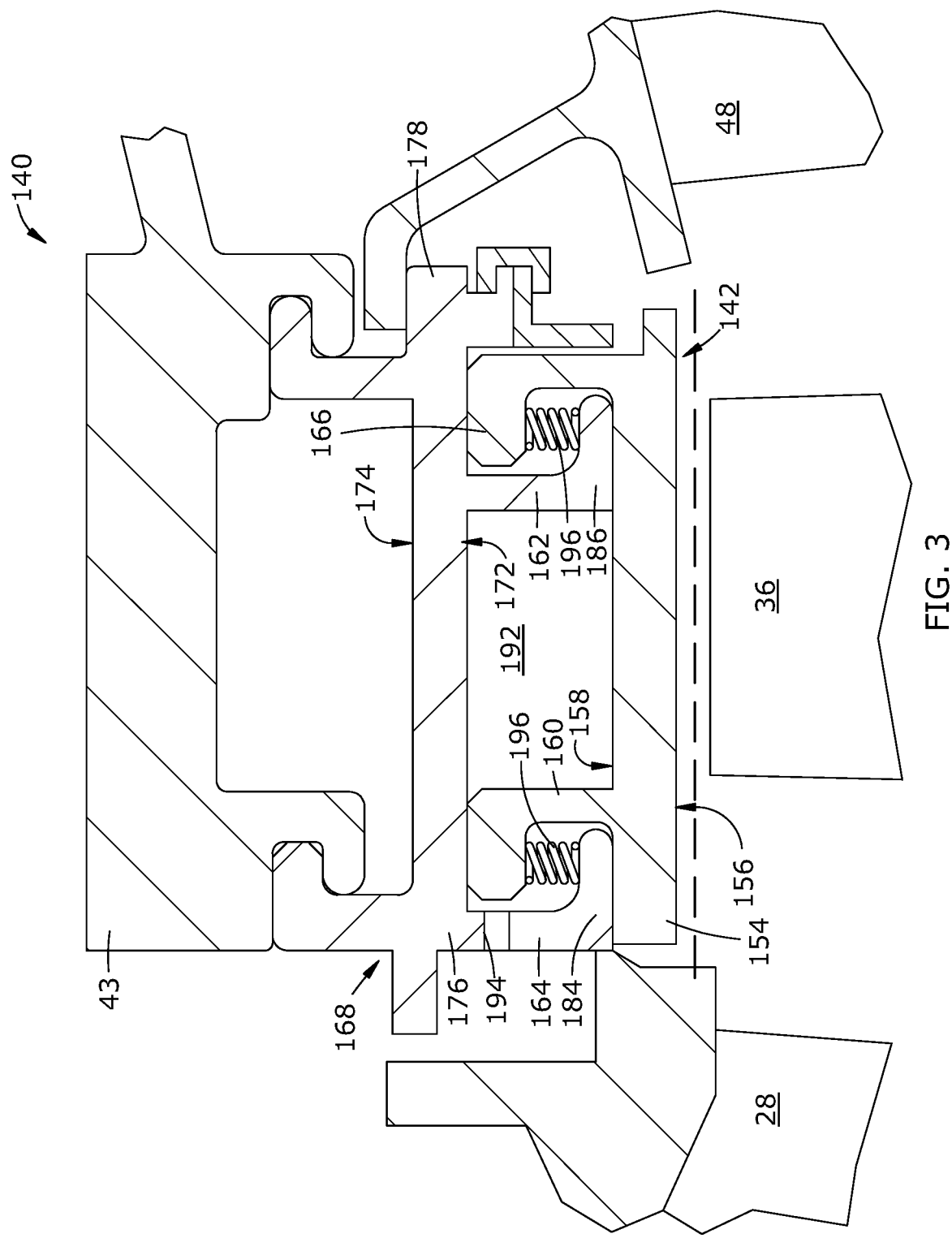
FIG. 3 is cross-sectional view of an alternative shroud assembly.

FIG. 3 illustrates an alternative shroud assembly 140 similar in construction to the shroud assembly 40 described above. Elements of the shroud assembly 140 not specifically described may be considered to be identical to the corresponding elements of the shroud assembly 40.

The shroud assembly includes an annular array of shroud segments 142 each including a base 154 having a flowpath surface 156 which faces the blade tip 44, and an opposed backside surface 158. The flowpath surface 156 has a first surface area "A1". Forward and aft walls 160 and 162 extend radially outwardly from the backside surface 158 and include forward and aft flanges 164 and 166 respectively. The backside surface 158 has a second surface area "A2".

The shroud segments 142 are supported by an array of arcuate shroud hangers 168 which are in turn supported by the HPT case 43 or other structural support element. The shroud hanger 168 includes opposed inner and outer faces 172 and 174, and opposed forward and aft ends 176 and 178.

A forward hook 184 having a generally L-shaped cross-section extends radially inward from the inner face 172, at or near the forward end 176. An aft hook 186 having a generally L-shaped cross-section extends radially inward from the inner face 172, at or near the aft end 178.

The forward hook 184 axially overlaps the forward flange 164 of the shroud segment 142. The aft hook 186 axially overlaps the aft flange 166 of the shroud segment 142. The dimensions of the shroud segment 142 and the shroud hanger 168 are selected so that the shroud segment 142 has some freedom of movement in the radial direction relative to the shroud hanger 168, to move between a first, radially inboard position, shown by a dashed line, and a second, radially outboard position, shown by solid lines.

A shroud plenum 192 is defined between the shroud hanger 168 and the shroud segment on 42. One or more supply holes 194 are formed in the shroud hanger 168. In operation, cooling air from a source within the engine, for example compressor bleed air, is routed to the supply holes 194. It subsequently flows into the shroud plenum 192 where is it used for cooling and/or pressurization.

Biasing means are provided to bias or urge the shroud segment 142 in a predetermined radial direction (either inboard or outboard). In the illustrated example, biasing means urge the shroud segments 142 radially outwards towards the second position described above, which is the radially outer limit of movement of the shroud segment 142. In the illustrated example, the biasing means comprise one or more springs 196 disposed between the forward wall 160 and the shroud hanger 168, and one or more springs 196 disposed between the aft wall 162 and the shroud hanger 168. Coil-type compression springs are shown as an example, but it will be understood that any type of spring with adequate dimensions, material properties, and spring constant "k" may be used.

In operation, the shroud plenum 192 is supplied with pressurized air (for example compressor bleed air B (see FIG. 1) at a first static pressure "Pp". This pressure exerts an inboard-directed force "Fp" on the shroud segment 142, where Fp=Pp*A2.

The springs 196 or other biasing element exert an outboard-directed force "Fsp" defined as Fsp=kx, where k is the spring constant, and x is the deflection from the free length of the spring 196.

In this embodiment, in contrast to the FIG. 2 embodiment, the springs 196 act in opposition to the pressure in the shroud plenum 192. In effect, this makes the shroud segments 142 more easily moved to the outboard position. This arrangement may be desirable or necessary where the plenum pressure force Fp is consistently greater than the flowpath pressure force Ffp.

Figure 4:
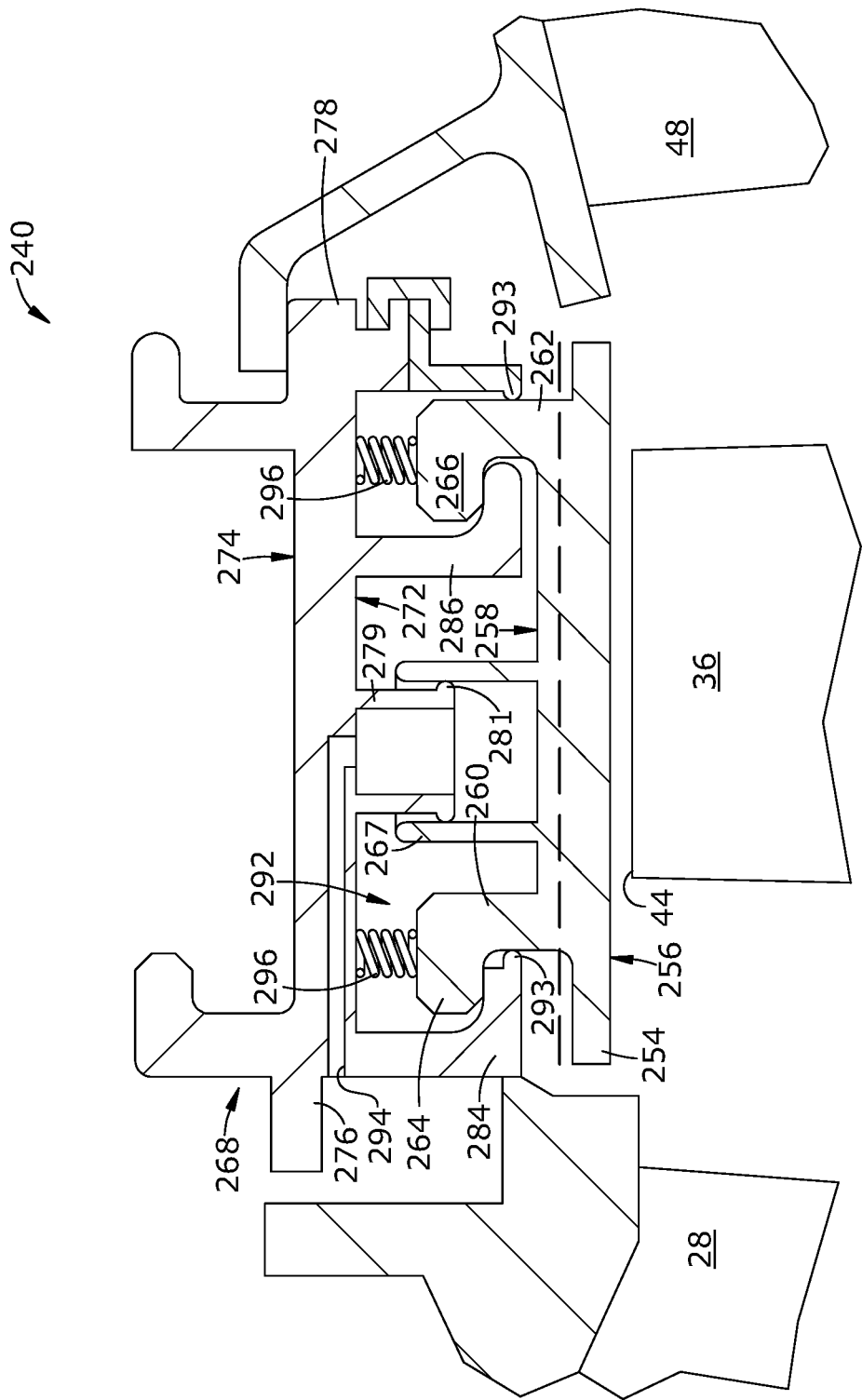
FIG. 4 is cross-sectional view of another alternative shroud assembly.

FIG. 4 illustrates another alternative shroud assembly 240 similar in construction to the shroud assembly 40 described above. Elements of the shroud assembly 240 not specifically described may be considered to be identical to the corresponding elements of the shroud assembly 40.

The shroud assembly 240 includes an annular array of shroud segments 242 each including a base 254 having a flowpath surface 256 which faces the blade tip 44, and an opposed backside surface 258. The flowpath surface 256 has a surface area "A3". Forward and aft walls 260 and 262 extend radially outwardly from the backside surface 258 and include forward and aft flanges 264 and 266 respectively. An outer cylinder 267 extends from the backside surface 258. The outer cylinder 267 is open at its outboard end and communicates with the backside surface 258 at its inboard end. The outer cylinder 267 encloses a portion of the backside surface 258 having a surface area "A4" which is less than the surface area A3 of the flowpath surface 256.

The shroud segments 242 are supported by an array of arcuate shroud hangers 268 which are in turn supported by an HPT case or other structural support element (not shown). The shroud hanger 268 includes opposed inner and outer faces 272 and 274, and opposed forward and aft ends 276 and 278.

An inner cylinder 279 extends from the inner face 272. The inner cylinder 279 is open at its inboard and communicates with the inner face 272 at its outboard end. The inner cylinder 279 is received in the outer cylinder 267 of the shroud segment 242 in a sliding fit. A seal lip 281 or similar structure may be provided to minimize air leakage between the inner cylinder 279 and the outer cylinder 267. Collectively the outer cylinder 267 and the outer cylinder 279 define a piston-cylinder apparatus. It will be understood that the two members of the piston-cylinder apparatus need not be literally cylindrical to function. For example, the two elements could have elliptical or polygonal cross-sectional shapes.

A forward hook 284 having a generally L-shaped cross-section extends radially inward from the inner face 272, at or near the forward end 276. An aft hook 286 having a generally L-shaped cross-section extends radially inward from the inner face 272, at or near the aft end 278.

The forward hook 284 axially overlaps the forward flange 264 of the shroud segment 242. The aft hook 286 axially overlaps the aft flange 266 of the shroud segment 242. The dimensions of the shroud segment 242 and the shroud hanger 268 are selected so that the shroud segment 242 has some freedom of movement in the radial direction relative to the shroud hanger 268, to move between a first, radially inboard position and a second, radially outboard position, shown by a dashed line.

A shroud plenum 292 is defined between the shroud hanger 268 and the shroud segment on 42. The shroud plenum 292 may be sealed off from the surrounding secondary flowpath, for example by sealing lips 293. One or more supply holes 294 are formed in the shroud hanger 268, in flow communication with the inner cylinder 279. In operation, cooling air from a source within the engine, for example compressor bleed air, is routed to the supply holes 294.

Biasing means are provided to bias or urge the shroud segment 242 in a predetermined radial direction (either inboard or outboard). In the illustrated example, biasing means urge the shroud segments 242 radially inwards towards the first position described above, which is the radially inward limit of movement of the shroud segment 242. In the illustrated example, the biasing means comprise one or more springs 296 disposed between the forward wall 260 and the shroud hanger 268, and one or more springs 296 disposed between the aft wall 262 and the shroud hanger 268. Coil-type compression springs are shown as an example, but it will be understood that any type of spring with adequate dimensions, material properties, and spring constant "k" may be used.

In operation, the inner cylinder 279 is supplied with pressurized air (for example compressor bleed air at a first static pressure "Pp". This pressure exerts an inboard-directed force "Fp" on the shroud segment 242, where Fp=Pp*A4.

Operation of the shroud segment 242 and radial movement in response to response to the balance of cold side forces and hot side forces is substantially as described above for the FIG. 2 embodiment, the difference being that plenum pressure Pp operates on a surface area A4 which is substantially less than the surface area A3 of the flowpath surface 256. In effect, this makes the shroud segments 242 more easily moved to the outboard position. This arrangement may be desirable or necessary where the plenum pressure force Fp is consistently greater than the flowpath pressure force Ffp.

The ratio of surface area A4/A3 may be selected to produce a desired balance of forces on the shroud segment 242. Given careful selection, it may be possible to eliminate springs 296, thus controlling the position of the shroud segment 242 in a "purely pneumatic" mode.

Figure 5:
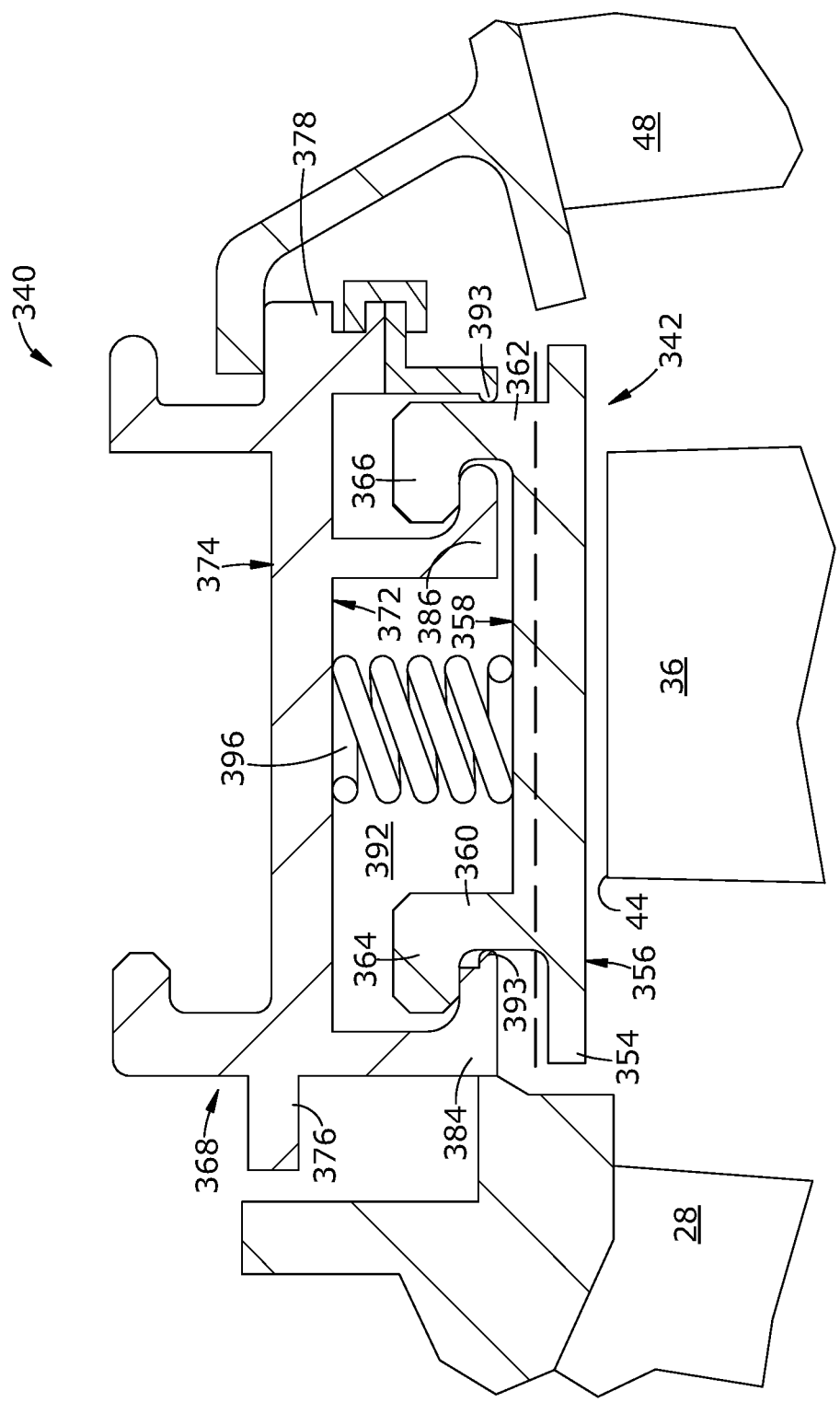
FIG. 5 is a cross-sectional view of another alternative shroud assembly.

FIG. 5 illustrates an alternative shroud assembly 340 similar in construction to the shroud assembly 40 described above. Elements of the shroud assembly 340 not specifically described may be considered to be identical to the corresponding elements of the shroud assembly 40.

The shroud assembly includes an annular array of shroud segments 342 each including a base 354 having a flowpath surface 356 which faces the blade tip 44, and an opposed backside surface 358. The flowpath surface 356 has a first surface area "A1". Forward and aft walls 360 and 362 extend radially outwardly from the backside surface 358 and include forward and aft flanges 364 and 366 respectively, backside surface 358 has a second surface area "A2".

The shroud segments 342 are supported by an array of arcuate shroud hangers 368 which are in turn supported by an HPT case or other structural support element. The shroud hanger 368 includes opposed inner and outer faces 372 and 374, and opposed forward and aft ends 376 and 378.

A forward hook 384 having a generally L-shaped cross-section extends radially inward from the inner face 372, at or near the forward end 376. An aft hook 386 having a generally L-shaped cross-section extends radially inward from the inner face 372, at or near the aft end 378.

The forward hook 384 axially overlaps the forward flange 364 of the shroud segment 342. The aft hook 386 axially overlaps the aft flange 366 of the shroud segment 342. The dimensions of the shroud segment 342 and the shroud hanger 368 are selected so that the shroud segment 342 has some freedom of movement in the radial direction relative to the shroud hanger 368, to move between a first, radially inboard position, and a second, radially outboard position, shown by a dashed line.

A shroud plenum 392 is defined between the shroud hanger 368 and the shroud segment 342. The shroud plenum 392 may be sealed off from the surrounding secondary flowpath, for example by sealing lips 393.

Biasing means are provided to bias or urge the shroud segment 342 in a predetermined radial direction (either inboard or outboard). In the illustrated example, biasing means urge the shroud segments 342 radially inwards towards the first position described above, which is the radially inward limit of movement of the shroud segment 342. In the illustrated example, the biasing means comprise one or more springs 396 disposed between the shroud segment 342 and the shroud hanger 368. Coil-type compression springs are shown as an example, but it will be understood that any type of spring with adequate dimensions, material properties, and spring constant "k" may be used.

The springs 396 or other biasing element exert an inboard-directed force "Fsp" defined as Fsp=kx, where k is the spring constant, and x is the deflection from the free length of the spring 396.

Operation of the shroud segment 342 and radial movement in response to response to the balance of cold side forces and hot side forces is similar to that described above for the FIG. 2 embodiment, the difference being that plenum pressure Pp is minimal as the shroud plenum 392 is not actively pressurized. Accordingly, substantially all of the cold side forces are provided by the biasing means, e.g. spring 396. A substantially larger spring 396 (as compared to the FIG. 2 embodiment) is depicted to reflect this difference. As this embodiment would provide minimal active cooling to the shroud segments 342, it may be most appropriate for shroud segments 342 made from high-temperature capable materials, such as ceramic matrix composites ("CMC").

The shroud assembly described herein has several advantages over a prior art design. It mitigates Alford whirl without the need to significantly increase engine weight. It may be implemented with a simple modification to existing shroud designs and is compatible with ACC systems. It functions with both static eccentricity and non-synchronous eccentricity; it responds dynamically.

The foregoing has described a shroud assembly for a gas turbine engine. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of reducing whirl in a gas turbine engine including:
    a compressor;
    a combustor disposed downstream of the compressor and
    a turbine disposed downstream of the combustor, the turbine including a rotor having a rotatable disk carrying a plurality of turbine blades, the turbine mechanically connected to the compressor by a shaft rotatable about an engine centerline axis, the turbine further including a shroud assembly surrounding the rotor, wherein the shroud assembly includes: an at least one shroud segment having a flowpath side defining a portion of the primary engine flowpath, and an opposed backside, and a corresponding shroud hanger including an inner face, opposing and spaced from the opposed backside of the at least one shroud segment, the method comprising:
    mounting the at least one shroud segments to the corresponding shroud hanger such that it is movable in a radial direction between an inboard position and an outboard position, in response to a balance of gas pressures prevailing on the flowpath side and the backside during engine operation; and
    radially biasing a radially outer portion of the at least one shroud segment radially inwardly with respect to the engine centerline axis and away from the inner face of the shroud hanger to move the at least one shroud segment towards the outboard position in response to a local increase in gas pressure prevailing on the flowpath side during engine operation, wherein the radially biasing is done at least partially through a piston-cylinder extending from the inner face of the shroud hanger and radially toward the at least one segment, and at least partially through at least one coil-type compression spring.

2. The method of claim 1, further comprising urging at least a portion of the shroud assembly towards the inboard position by the at least one coil-type compression spring.

3. The method of claim 1, wherein the radially biasing is done through at least coil-type compression spring that is arranged so as to urge the shroud assembly towards the outboard position.

4. The method of claim 1, further comprising aligning each of the at least one shroud segment with the corresponding shroud hanger such that a space is formed between the at least one shroud segment and the corresponding shroud hanger to define a shroud plenum, with the radially outer portion of the at least one shroud segment being in fluid communication with the shroud plenum.

5. The method of claim 4, further comprising fluidly coupling the shroud plenum to at least one supply hole disposed within a portion of the shroud hanger.

6. The method of claim 4, further comprising sealing an interior of the plenum from fluid communication with an exterior thereof.

7. The method of claim 1, further comprising forming the at least one shroud segment with a ceramic matrix composite material.

8. The method of claim 1, further comprising urging the at least one shroud segment towards the inboard position.

9. The method of claim 1, further comprising the step of radially biasing the at least one shroud segment back towards the inboard position in response to gas pressure decreasing.

10. The method of claim 1, further comprising fluidly coupling at least a portion of the piston-cylinder with a supply hole provided within a portion of the shroud hanger.

11. The method of claim 1, further comprising aligning a first outer cylinder of the piston-cylinder extending from the backside surface of the at least one shroud segment with a second outer cylinder extending from the inner face of the shroud hanger such that the first outer cylinder circumscribes the second outer cylinder and the second outer cylinder extends into at least a portion of the first outer cylinder.

12. The method of claim 11, further comprising sealing a space between the first outer cylinder and the second outer cylinder from an interior.

13. The method of claim 1, further comprising coupling the shroud assembly to a corresponding portion of a case of the turbine.

14. The method of claim 13, further comprising coupling the shroud hanger to a corresponding portion of a high-pressure turbine case of the turbine.

15. The method of claim 4, further comprising fluidly coupling at least a portion of the shroud assembly to the compressor of the gas turbine engine.

16. The method of claim 15, further comprising fluidly coupling the shroud plenum to the compressor of the gas turbine engine.

17. The method of claim 16, further comprising fluidly coupling the shroud plenum to the compressor of the gas turbine through at least one supply hole formed within a portion of the shroud hanger.

* * * * *